United States Patent
Afshari et al.

(10) Patent No.: US 11,193,240 B2
(45) Date of Patent: *Dec. 7, 2021

(54) PAPER COMPRISING ARAMID PULP SUITABLE FOR ELECTROCHEMICAL CELLS, AND ELECTROCHEMICAL CELLS MADE THEREFROM

(71) Applicant: DUPONT SAFETY & CONSTRUCTION, INC., Wilmington, DE (US)

(72) Inventors: Mehdi Afshari, Midlothian, VA (US); Byoung Sam Kang, Midlothian, VA (US); Brian R. France, N. Chesterfield, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,206

(22) Filed: Aug. 4, 2020

(65) Prior Publication Data

US 2020/0362516 A1 Nov. 19, 2020

Related U.S. Application Data

(63) Continuation-in-part of application No. 16/166,296, filed on Oct. 22, 2018, now Pat. No. 10,767,316.

(60) Provisional application No. 62/580,009, filed on Nov. 1, 2017.

(51) Int. Cl.

| | |
|---|---|
| *D21H 13/26* | (2006.01) |
| *D21H 17/34* | (2006.01) |
| *D21H 23/04* | (2006.01) |
| *D21H 15/10* | (2006.01) |
| *D21H 21/14* | (2006.01) |
| *H01M 50/449* | (2021.01) |

(52) U.S. Cl.
CPC ............ *D21H 13/26* (2013.01); *D21H 15/10* (2013.01); *D21H 17/34* (2013.01); *D21H 21/14* (2013.01); *D21H 23/04* (2013.01); *H01M 50/449* (2021.01)

(58) Field of Classification Search
USPC ....................................... 162/135
See application file for complete search history.

(56) References Cited

U.S. PATENT DOCUMENTS

| | | | |
|---|---|---|---|
| 3,036,950 A | 5/1962 | Martin | |
| 5,202,184 A | 4/1993 | Brierre et al. | |
| 5,474,842 A | 12/1995 | Hoiness | |
| 5,532,059 A * | 7/1996 | Lee | D01F 6/90 |
| | | | 428/359 |
| 6,001,750 A * | 12/1999 | Lam | C04B 30/02 |
| | | | 442/153 |
| 6,139,688 A | 10/2000 | Ramachandran | |
| 10,767,316 B2 * | 9/2020 | Afshari | D21H 19/24 |
| 2007/0137818 A1 * | 6/2007 | Levit | C09K 3/1028 |
| | | | 162/146 |
| 2020/0056332 A1 * | 2/2020 | Afshari | D21H 13/26 |

FOREIGN PATENT DOCUMENTS

| | | |
|---|---|---|
| WO | 96/10105 A1 | 4/1996 |
| WO | 2007/075575 A2 | 7/2007 |
| WO | 2018/037015 A1 | 3/2018 |

OTHER PUBLICATIONS

PCT International Search Report, dated Feb. 4, 2019, for International Application PCT/US20/057997, filed Oct. 29, 2018. ISA/EP, Romich, Lars-Oliver, Authorized Officer.

* cited by examiner

*Primary Examiner* — Mark Halpern

(57) ABSTRACT

A paper suitable for use as a separator or thermal or fire insulation for use in or with electrochemical cells, and an electrochemical cell comprising the same, the paper having 90 to 99 weight percent aramid fibrous pulp comprising aramid polymer fibrils and 1 to 10 weight percent polyvinylpyrrolidone present as a coating on the surface of the fibers, the paper having a thickness of 10 to 40 micrometers and a tensile strength of at least 15 megapascals or greater.

24 Claims, 2 Drawing Sheets

Fig. 3

PAPER COMPRISING ARAMID PULP SUITABLE FOR ELECTROCHEMICAL CELLS, AND ELECTROCHEMICAL CELLS MADE THEREFROM

PRIORITY DATA

This application is a continuation-in-part of U.S. application Ser. No. 16/166,296, filed Oct. 22, 2018, which claims priority to U.S. provisional application Ser. No. 62/580,009, filed Nov. 1, 2017.

BACKGROUND

This invention pertains to a base paper comprising aramid pulp and polyvinylpyrrolidone. The paper, when coated with resin, is useful as a friction material. In some other embodiments, the paper itself, the base paper, is suitable for use as an electrolyte separator or as thermal or flame insulation in an electrochemical cell.

U.S. Pat. No. 5,532,059 to Lee discloses a fibrous pulp of a combination of poly(p-phenylene terephthalamide) and poly(vinyl pyrrolidone) along with a process for making it. The process involves conducting a poly(p-phenylene terephthalamide polymerization reaction in the presence of poly(vinyl pyrrolidone) and the product is an improved pulp with increased fibrils and no fiber stalks.

U.S. Pat. No. 3,036,950 to Martin describes a process for depositing a water-dispersible resin on beaten cellulose pulp fibers comprising first dispersing polyvinylpyrrolidone into an aqueous slurry of said fibers, and subsequently dispersing said resin into said slurry, the polyvinylpyrrolidone being added in an amount of at least about 0.05% by weight based on the dry weight of said pulp fibers.

U.S. Pat. No. 6,139,688 to Ramachandran teaches a coated aramid fiber wherein the coating is a small amount of chitosan and the coated fiber is useful in manufacture of an improved friction paper.

There is an ongoing need to provide a paper for friction applications, and likewise papers suitable for use in or with electrochemical cells; that is, papers that are suitable as separators in electrochemical cells (commonly known as battery separators) that can also operate at very high temperatures; or papers that can be used as thermal insulation or a flame barrier within or around a electrochemical cell or a electrochemical module containing a plurality of electrochemical cells, wherein the tensile strength of the paper can be increased.

SUMMARY OF THE INVENTION

This invention relates to a paper, suitable for use as a separator or insulation for electrochemical cells, comprising:
 a) 90 to 99 weight percent, based on the total weight of the paper, of an aramid fibrous pulp, the aramid fibrous pulp comprising aramid polymer fibrils, wherein the aramid polymer fibrils have: i) a diameter of 10 to 2000 nanometers, ii) a length of 0.2 to 3 millimeters, iii) a specific surface area of 3 to 40 square meters/gram, and iv) a Canadian Standard Freeness of 0 to 100 milliliters; and
 b) 1 to 10 weight percent, based on the total weight of the paper, of polyvinylpyrrolidone present as a coating on the surface of the fibers, the coating being neither chemically nor electrostatically bound to the fibers; the paper having a thickness of 10 to 40 micrometers and a tensile strength of at least 15 megapascals or greater.

This invention also relates to an electrochemical cell or electrochemical cell module comprising a paper as a electrolyte separator or as thermal or flame insulation, the paper comprising:
 a) 90 to 99 weight percent, based on the total weight of the paper, of an aramid fibrous pulp, the aramid fibrous pulp comprising aramid polymer fibrils, wherein the aramid polymer fibrils have: i) a diameter of 10 to 2000 nanometers, ii) a length of 0.2 to 3 millimeters, iii) a specific surface area of 3 to 40 square meters/gram, and iv) a Canadian Standard Freeness of 0 to 100 milliliters; and
 b) 1 to 10 weight percent, based on the total weight of the paper, of polyvinylpyrrolidone present as a coating on the surface of the fibers, the coating being neither chemically nor electrostatically bound to the fibers;
 the paper having a thickness of 10 to 40 micrometers and a tensile strength of at least 15 megapascals or greater.

DETAILED DESCRIPTION

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same or any other heading or other portion of the disclosure.

Any combination of the elements described herein in all possible variations thereof is encompassed by the invention unless otherwise indicated herein or otherwise clearly contradicted by context.

Definitions

As used herein, the term "paper" is employed in its normal meaning and refers to a nonwoven sheet prepared using conventional wet-lay papermaking processes and equipment. In the context of this disclosure, a paper is also referred to as a "base paper" interchangeably. Unless specifically designated otherwise herein, both the word "paper" and "base paper" are considered to include the polyvinylpyrrolidone (PVP) coating.

A "friction paper" as described herein is a composite comprising the base paper as described above and additionally a friction resin coating that is different from the PVP coating.

By "pulp", in regards to its use in friction papers, is meant particles of aramid material having a stalk and fibrils extending therefrom wherein the stalk is generally columnar and about 10 to 50 microns in diameter and the fibrils are hair-like members only a fraction of a micron or a few microns in diameter attached to the stalk and about 10 to 100 microns long. In paper manufacture, the fibrils on pulp are important to act as hooks or fasteners to hold adjacent particles in the paper and provide integrity to the paper construction. The surface area of pulp used herein is 0.5 to 20 square meters per gram. Aramid pulp may be made, for example, by refining aramid floc or as described in U.S. Pat. No. 5,202,184.

Floc comprises generally short fibers made by cutting continuous filament fibers into short lengths without significant fibrillation. Although the lengths of the short fibers can be of almost any length, an example of a suitable range is from 1 mm to 12 mm for a reinforcing fiber and from 5 mm to 800 mm for a staple fiber that is spun into a yarn. Typically, floc has a surface area of about 0.08 to 0.6 square meters per gram. Short fibers suitable for use in the present invention are the reinforcing fibers disclosed in U.S. Pat. No. 5,474,842 to Hoiness.

The term "fibrids" as used herein, means a very finely-divided polymer product of small, filmy, essentially two-dimensional, particles having a length and width of about 100 to 1000 micrometers and a thickness of about 0.1 to 1 micrometer.

In the context of this application the term aramid includes a polymer wherein at least 85% of the amide (—CONH—) linkages are attached directly to two aromatic rings. Additives can be used with the aramid; and it has been found that up to as much as 10 percent by weight of other polymeric material can be blended with the aramid, or that copolymers can be used having as much as 10 percent of other diamine substituted for the diamine of the aramid, or as much as 10 percent of other diacid chloride substituted for the diacid chloride of the aramid. Para-aramids are exemplary polymers in fibers of this invention and poly(p-phenylene terephthalamide)(PPD-T) is the preferred para-aramid. Another suitable aramid type fiber is one based on aromatic copolyamide such as is prepared by reaction of terephthaloyl chloride (TPA) with a combination mixture (for example, a 50/50 mole ratio) of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives thereof, or isomers of the foregoing. Another fiber type is an aromatic copolymer derived from the copolymerization of para-phenylenediamine, 5(6)-amino-2-(p-aminophenyl)benzimidazole and terephthaloyl dichloride.

Paper

In the context of this disclosure, a paper is also referred to as a base paper.

In one embodiment, the paper comprises from 60 to 99 weight percent of aramid fiber pulp, such as p-aramid fiber pulp, said pulp comprising fibers, and from 1 to 40 weight percent of a polyvinylpyrrolidone (PVP) coating on the surface of the fibers, the coating being neither chemically nor electrostatically bound to the fibers.

In another embodiment, the paper comprises from 80 to 98 weight percent of aramid fiber pulp, such as p-aramid fiber pulp, and from 2 to 20 weight percent of a polyvinylpyrrolidone (PVP) coating.

In another embodiment, the paper comprises from 80 to 95 weight percent of aramid fiber pulp, such as p-aramid fiber pulp, and from 5 to 20 weight percent of a polyvinylpyrrolidone (PVP) coating.

In a further embodiment, the paper comprises from 80 to 90 weight percent of aramid fiber pulp, such as p-aramid fiber pulp, and from 10 to 20 weight percent of a polyvinylpyrrolidone (PVP) coating.

In yet another embodiment, the paper further comprises from 1 to 30 weight percent of aramid floc, such as p-aramid floc. Alternatively, the paper further comprises from 1 to 20 weight percent of aramid floc, such as p-aramid floc, or from 1 to 10 weight percent of aramid floc, such as p-aramid floc.

Paper can also be made using a combination of aramid floc and aramid fibrids wherein the fibrids serve to hold together the floc and other paper components.

The paper may further comprise components such as fillers or friction modifying particles. Exemplary fillers include silica, diatomaceous earth, graphite and alumina. Exemplary friction modifying particles include metal oxides, nitrides, carbides and mixtures thereof. The friction modifying particles may have at least one dimension of less than 1 micrometer.

One method of applying the PVP to the aramid pulp is by adding the PVP to an aqueous slurry of the pulp and other fibrous materials, forming a paper and drying the paper. However, other methods may also be used.

The paper may be made on any suitable paper making machine using techniques well known in the art.

Friction Paper

A friction paper as described herein is a composite comprising the base paper as described above and a resin coating.

In one embodiment, the friction paper comprises from 40 to 95 weight percent of a base paper and from 5 to 60 weight percent of a resin.

In another embodiment, the friction paper comprises from 60 to 90 weight percent of a base paper and from 10 to 40 weight percent of a resin.

Friction Paper Resin

The resin component of the friction paper may be phenolic, a modified phenolic resin, silicone, polyimide or combinations thereof.

Silicone resins useful in the present invention include, for example, thermal curing silicone sealants and silicone rubbers. Another useful resin is an epoxy modified phenolic resin which contains about 5 to about 25 percent, by weight, and preferably about 10 to about 15 percent, by weight, of an epoxy compound with the remainder (excluding solvents and other processing aids) being phenolic resin.

The resin is impregnated onto and into the base paper, and then cured by heat and pressure to form the final shape of the friction paper, as known in the art. Conventional techniques such as immersion coating and surface coating may be used to impregnate the paper.

Industrial Applicability

The present invention is useful as a high energy friction material for use with clutch plates, transmission bands, brake shoes, synchronizer rings, friction disks or system plates.

Some embodiments disclosed herein are set forth in the following clauses, and any combination of these clauses (or portions thereof) may be made to define an embodiment. For example, if a composition described in an embodiment may vary according to an additional feature or claim element, it is to be understood that other compositions described in other embodiments may also vary according to that same additional feature or claim element. For example, Clause 1a discloses an embodiment wherein the aramid fiber pulp in the paper of clause 1 is a p-aramid fiber pulp; similarly, for any other embodiment disclosing a paper or a composite comprising (or consisting of, or consisting essentially of) an aramid fiber pulp, there exists another embodiment wherein the paper or composite comprises (or consists of, or consists essentially of) a p-aramid fiber pulp. Generally, for any embodiment described herein for which a composition (such as a paper or a composite) comprises, or consists of, or consists essentially of an aramid fibrous pulp or an aramid floc or an aramid fibrid, there exists another corresponding embodiment which comprises, or consists of, or consists essentially of a p-aramid fibrous pulp or a p-aramid floc or a p-aramid fibrid. Furthermore, methods described herein that utilize a composition may also vary by way of such compositional variations.

Clause 1: A paper comprising from 60 to 99 weight percent based on the total weight of the paper of aramid fibrous pulp, said fibrous pulp comprising fibers, and from 1 to 40 weight percent based on the total weight of the paper of polyvinylpyrrolidone present as a coating on the surface of the fibers, the coating being neither chemically nor electrostatically bound to the fibers.

Clause 1a: In an embodiment, the aramid fibrous pulp in the paper of clause 1 is a p-aramid fibrous pulp.

Clause 2: The paper of clause 1 or 1a comprising from 80 to 99 weight percent of aramid fibrous pulp or p-aramid fibrous pulp and from 1 to 20 weight percent of polyvinylpyrrolidone. In an embodiment, the paper of clause 1 or 1a comprises from 80 to 98 weight percent of aramid fibrous pulp or p-aramid fibrous pulp and from 2 to 20 weight percent of polyvinylpyrrolidone.

Clause 3: The paper of clause 1 or 1a comprising from 80 to 95 weight percent of aramid fibrous pulp or p-aramid fibrous pulp and from 5 to 20 weight percent of polyvinylpyrrolidone.

Clause 4: The paper of clause 1 or 1a comprising from 80 to 90 weight percent of aramid fibrous pulp or p-aramid fibrous pulp and from 10 to 20 weight percent of polyvinylpyrrolidone.

Clause 4a: In an embodiment, there is provided a paper comprising aramid fibrous pulp or p-aramid fibrous pulp, said fibrous pulp comprising fibers, and polyvinylpyrrolidone present as a coating on the surface of the fibers, the coating being neither chemically nor electrostatically bound to the fibers; wherein the weight ratio of aramid fibrous pulp or p-aramid fibrous pulp to polyvinylpyrrolidone is from 60:40 to 99:1; or is from 80:20 to 99:1; or is from 80:20 to 98:2; or is from 80:20 to 95:5; or is from 80:20 to 90:10.

Clause 5: The paper of any of the preceding clauses having a ratio of tensile strength to average Gurley air permeability 300 cc value of at least 4.0 MPa/s. In an embodiment, the ratio of tensile strength to average Gurley air permeability 300 cc value is at least 4.3 MPa/s.

Clause 6: The paper of clause 1 consisting of, or consisting essentially of, from 60 to 99 weight percent of aramid fibrous pulp and from 1 to 40 weight percent of polyvinylpyrrolidone.

Clause 6a: The paper of clause 1 consisting of, or consisting essentially of, from 80 to 98 weight percent of aramid fibrous pulp and from 2 to 20 weight percent of polyvinylpyrrolidone.

Clause 6b: The paper of clause 1 consisting of, or consisting essentially of, from 80 to 95 weight percent of aramid fibrous pulp and from 5 to 20 weight percent of polyvinylpyrrolidone.

Clause 6c: The paper of clause 1 consisting of, or consisting essentially of, from 80 to 90 weight percent of p-aramid fibrous pulp and from 10 to 20 weight percent of polyvinylpyrrolidone.

Clause 7: The paper of clause 1 further comprising aramid floc, such as p-aramid floc, said floc comprising fibers, which floc is present in an amount of from 1 to 30 weight percent based on the total weight of the paper, wherein the polyvinylpyrrolidone is present as a coating on the surface of the aramid fibrous pulp fibers and the aramid floc fibers, and wherein the aramid fibrous pulp is no more than 98 weight percent based on the total weight of the paper. In an embodiment, the aramid fibrous pulp and the aramid floc are p-aramid fibrous pulp and p-aramid floc.

Clause 7a: The paper of clause 1 further comprising aramid floc, said floc comprising fibers, which floc is present in an amount of from 1 to 20, or 5 to 20 weight percent based on the total weight of the paper, wherein the polyvinylpyrrolidone is present as a coating on the surface of the aramid fibrous pulp fibers and the aramid floc fibers, and wherein the p-aramid fibrous pulp is no more than 98 weight percent based on the total weight of the paper. In an embodiment, the aramid fibrous pulp and the aramid floc are p-aramid fibrous pulp and p-aramid floc.

Clause 7b: In an embodiment, there is provided the paper of clause 4a further comprising aramid floc. In one such embodiment, the aramid floc is present in an amount of from 1 to 30, or 1 to 20, or 5 to 20, weight percent based on the total weight of the paper. In an embodiment, the aramid floc is p-aramid floc.

Clause 8: The paper of clause 1 further comprising a combination of aramid floc and aramid fibrids, said aramid floc and aramid fibrids comprising fibers, which combination of aramid floc and aramid fibrids is present in an amount of from 1 to 30, or 1 to 20, or 5 to 20 weight percent based on the total weight of the paper, wherein the polyvinylpyrrolidone is present as a coating on the surface of the aramid fibrous pulp fibers and the aramid floc fibers and the aramid fibrids, and wherein the aramid fibrous pulp is no more than 98 weight percent based on the total weight of the paper. In an embodiment, the aramid fibrous pulp and the aramid floc and the aramid fibrids are p-aramid fibrous pulp and p-aramid floc and p-aramid fibrids.

Clause 8a: In some embodiments, the paper of clause 4a further comprises a combination of aramid floc and aramid fibrids. In one such embodiment, the combination of aramid floc and aramid fibrids is present in an amount of from 1 to 30, or 1 to 20, or 5 to 20, weight percent based on the total weight of the paper. In an embodiment, the aramid fibrous pulp and the aramid floc and the aramid fibrids are p-aramid fibrous pulp and p-aramid floc and p-aramid fibrids.

Clause 9: The paper of any of the preceding clauses further comprising fillers or friction modifying particles.

Clause 10: The paper of clause 9 wherein the fillers or friction modifying particles are one or more of: silica, diatomaceous earth, graphite, alumina, metal oxides, metal nitrides, or metal carbides.

Clause 10a: The paper of clause 9 wherein the fillers are one or more of: silica, diatomaceous earth, graphite, or alumina.

Clause 10b: The paper of clause 9 wherein the friction modifying particles are one or more of: metal oxides, metal nitrides, or metal carbides.

Clause 11: The paper of clause 7 consisting of, or consisting essentially of, from 60 to 98 weight percent based on the total weight of the paper of aramid fibrous pulp, from 1 to 30 weight percent based on the total weight of the paper of aramid floc, and from 1 to 20 weight percent based on the total weight of the paper of polyvinylpyrrolidone. In an embodiment, the aramid fibrous pulp and the aramid floc are p-aramid fibrous pulp and p-aramid floc.

Clause 11a: The paper of clause 7 consisting of, or consisting essentially of, from 60 to 93 weight percent based on the total weight of the paper of aramid fibrous pulp, from 5 to 20 weight percent based on the total weight of the paper of aramid floc, and from 2 to 20 weight percent based on the total weight of the paper of polyvinylpyrrolidone. In an embodiment, the aramid fibrous pulp and the aramid floc are p-aramid fibrous pulp and p-aramid floc.

Clause 12: A composite comprising from 40 to 95 weight percent of the paper of clause 1 and from 5 to 60 weight percent of a resin wherein the resin is phenolic, silicone, polyimide or combinations thereof.

Clause 13: The composite of clause 12 comprising from 60 to 90 weight percent of the paper of clause 1 and from 10 to 40 weight percent of the resin.

Clause 14: A composite comprising from 40 to 95 weight percent of the paper of clause 7 and from 5 to 60 weight percent of a resin wherein the resin is phenolic, silicone, polyimide or combinations thereof.

Clause 15: The composite of clause 14 comprising from 60 to 90 weight percent of the paper of clause 7 and from 10 to 40 weight percent of the resin.

In some embodiments, this invention further relates to papers suitable for use in or with electrochemical cells; that is, for example, as a electrolyte separator or as thermal insulation or a flame barrier for use internal or external to the cell or the cell module. The paper electrolyte separator is useful in separating the cathode from the anode in an electrochemical cell; the paper also having suitable permeability to electrolytes used in such cells. With the ongoing development of higher performing electrochemical cells (or batteries as they are commonly known) the need has increased for papers suitable as separators (commonly known as battery separators) that can also operate at very high temperatures or papers that can be used as thermal insulation or a flame barrier within or around a electrochemical cell or a electrochemical module containing a plurality of electrochemical cells. The terms "electrochemical cell" and "battery" are used interchangeably herein.

One of the requirements for a paper to be suitable for use as a separator in an electrochemical cell is that it be very thin. Many papers that are made very thin and thought suitable for use as separators in electrochemical cells do not perform well in this application. In particular, very thin papers may not have adequate strength for this application. Therefore, what is needed is a paper that has adequate tensile strength; and in addition has other properties (e.g., porosity, high temperature capability, fire and flame retardancy, etc.) suitable for use with electrochemical cells.

It has been found that a very useful paper suitable for such electrochemical cell applications can be made from an aramid fibrous pulp comprising aramid polymer fibrils provided with, in addition, a very small amount of a polyvinylpyrrolidone (PVP) coating on the surface of the fibrils. It has been found that the strength of these coated papers have unexpected high tensile strength when compared with papers comprising aramid fibrous pulp consisting of aramid polymer fibrils. One especially useful embodiment of this paper is a paper comprising aramid polymer fibrils made from a mixture of PPD-T/PVP polymers that is provided with, in addition, a very small amount of a polyvinylpyrrolidone (PVP) coating on the surface of those PPD-T/PVP fibrils.

Therefore, in some embodiments, this invention relates to a paper, suitable for use as a separator or thermal or flame insulation for electrochemical cells, comprising:
  a) 90 to 99 weight percent, based on the total weight of the paper, of an aramid fibrous pulp, the aramid fibrous pulp comprising aramid polymer fibrils, wherein the aramid polymer fibrils have:
    i) a diameter of 10 to 2000 nanometers,
    ii) a length of 0.2 to 3 millimeters,
    iii) a specific surface area of 3 to 40 square meters/gram, and
    iv) a Canadian Standard Freeness of 0 to 100 milliliters; and
  b) 1 to 10 weight percent, based on the total weight of the paper, of polyvinylpyrrolidone present as a coating on the surface of the fibers;
  the paper having a thickness of 10 to 40 micrometers and a tensile strength of at least 15 megapascals or greater. In some embodiments, the coating is neither chemically nor electrostatically bound to the fibers.

The paper suitable for use as a separator or thermal insulation for electrochemical cells comprises from 90 to 99 weight percent of aramid fiber pulp comprising aramid polymer fibrils, and from 1 to 10 weight percent of a polyvinylpyrrolidone (PVP) coating on the surface of the fibers, Preferably the paper comprises 90 to 97.5 weight percent aramid fiber pulp comprising aramid polymer and from 2.5 to 10 weight percent of a polyvinylpyrrolidone (PVP) coating on the surface of the fibers.

In some preferred embodiments, the aramid fiber pulp consists solely of aramid polymer fibrils. In some embodiments the aramid fiber pulp either comprises or consists of aramid polymer fibrils, and the paper has as a binder of aramid fibrids. The paper of any of these embodiments can further have aramid floc, if desired.

While one method of applying the PVP coating to the aramid fiber pulp is by adding the PVP to an aqueous slurry of the pulp and other fibrous materials; that is, the furnish of a paper machine, and then forming a paper and drying the paper, for papers suitable for use as a separator or thermal insulation for electrochemical cells can be made by an alternate method, if desired. Other methods such as a spray, kiss roll, etc., after making paper or during paper making process may also be used. The amount of PVP applied to the paper is very small, the papers having a final amount of PVP coating on the paper of about 10 percent by weight or less; therefore it can be more convenient to apply the PVP coating by spraying an aqueous solution of the PVP onto the formed paper prior to drying or calendering. However, it is believed a dried paper can be subsequently sprayed with the PVP solution and then re-dried with improvement.

Generally very dilute solutions of PVP in water are suitable for spraying the PVP coating onto the uncoated paper. One method of making the sprayable PVP solution is to add PVP powder to water at room temperature and mix it for 5 minutes to achieve complete dissolution of the powder in the water. Desirable and suitable sprayable PVP solutions include those that are about 2.5 to 15 weight percent PVP in water, although higher or lower concentrations of the PVP could be used, depending on the application process. The excess water is then removed after application to the paper by heating or drying the paper.

In a preferred embodiment, the aramid fiber pulp in the paper is greater than 90% by weight aramid polymer fibrils which bind together mechanically in the paper. If desired, an optional binder of aramid polymer fibrils can be used; if used, they are present in the paper in an amount that is 5 weight percent or less. This uncoated paper can be handled essentially as any other paper, it has measureable tensile strength and mechanical properties. Again in a preferred embodiment, the paper further has a coating of PVP of 1 to 10 weight percent, based on the weight of the paper. Due to the nanofiber structure of the fibrils, when the papers are coated by spraying the PVP onto one of the surfaces of the paper the PVP provides a light, permeable coating on the fibrils, providing some binding points between the fibrils but not appreciably affecting the permeability of the sheet to electrolytes. In other words the aramid polymer fibrids are the primary binder in the paper, with the PVP providing secondary binding.

In some preferred embodiments, the paper has both PVP present in the aramid polymer fibrils and PVP present as a polymer coating on the fibrils. It is believed the amount of PVP in the fibrils and the amount in the coating can be determined separately, with the amount in the coating found by careful washing of the paper to remove the PVP coating, which is water soluble, and then analyzing the wash solution for the presence of PVP. The remaining uncoated paper can then be analyzed by methods such as TGA to determine the amount of PVP in aramid polymer fibrils in the base paper. It is believed that the PVP that is present in the fibrils is substantially alloyed with the PPD-T polymer and cannot be appreciably removed by washing with water.

Generally, the mechanical strength increase provided to the paper by the application of only a small amount of PVP coating is essentially double or greater the strength of the uncoated paper. For example, a final coating on the paper of about 2 weight percent PVP can increase the tensile strength of the paper by more than 100%, and a final coating of on the paper of about 4 weight percent PVP can increase the tensile strength of the paper by more than 150%. Surprisingly, the small amount of the PVP coating on the paper means the paper porosity properties remain adequate for use in electrochemical cell applications.

Figure 1:
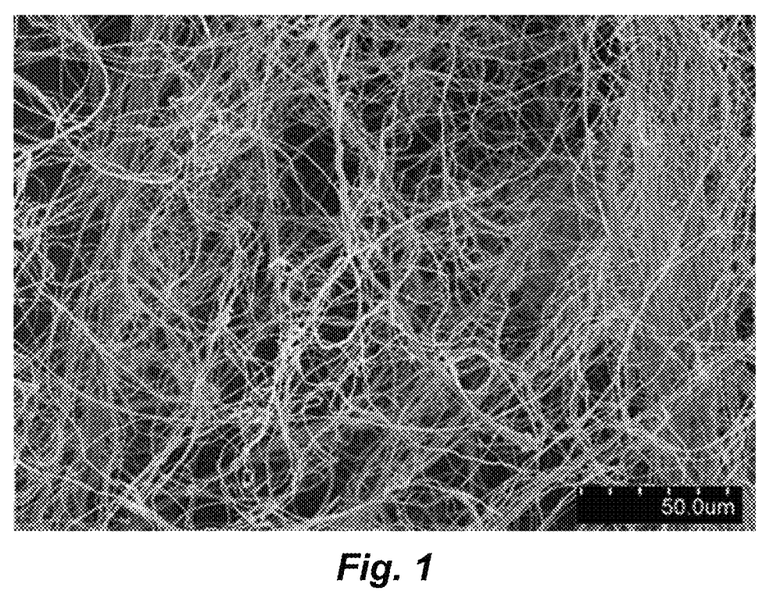
FIG. 1 is a digital photo of polyphenylene terephthalamide (PPD-T)/polyvinylpyrrolidone (PVP) fibrils

The term "aramid polymer fibrils", as used herein, are hair-like fibrous material having a diameter of 10 to 2000 nanometers, preferably 10 to 1200 nanometers, that is made from an aramid polymer, or polymer blend containing at least two polymers wherein a majority amount (greater than 50 weight percent) of aramid polymer is present. FIG. 1 is representative digital photo of aramid polymer fibrils. Aramid polymer fibrils further have a preferred length of 0.2 to 3 millimeters. The "length" of the fibrous material referred to herein, such as the aramid polymer fibrils and pulps, is meant to be the measured "length-weighted average" length. In some preferred embodiments, the aramid polymer fibrils are refined aramid polymer fibrils made from floc by exposing the floc to a refining step that shears the floc into the smaller aramid polymer fibrils. In some preferred embodiments, the aramid polymer fibrils have a length that is 0.4 to 3 millimeters (mm), preferably 0.8 to 3 mm.

It is believed the diameter of the aramid polymer fibrils has an impact on the pore size of the paper, and that aramid polymer fibrils having a diameter of greater than 2000 nanometers create a paper having an undesirably high pore size, which can ultimately result in failure of the paper. Also, it is believed that aramid polymer fibrils having a diameter of less than 10 nanometers or a length of less than about 0.2 millimeters do not contribute to the paper mechanical strength, therefore it is desirable that a majority of the aramid polymer fibrils have a length of 0.2 millimeters or greater. In addition, the small diameter of the aramid polymer fibrils facilitates the use of the fibrous material in very thin papers.

The aramid polymer fibrils further have an aspect ratio that can range from about 150 to 300,000. The aspect ratio is also known as the length divided by the diameter, and the phrases "aspect ratio", "average length-to-diameter ratio", and "length-to-diameter" are used interchangeably herein. In some embodiments, the average length-to-diameter ratio of the aramid polymer fibrils is about 1000 or greater. In some embodiments, the aramid polymer fibrils have an average length-to-diameter ratio of about 3000 or less. In some preferred embodiments, the average length-to-diameter ratio ranges from about 1000 to 3000. It is believed that the higher average length-to-diameter ratio of the aramid polymer fibrils contribute to better mechanical reinforcement, and therefore better mechanical properties of the paper.

Because the qualitative measurements of certain fibrous materials like aramid polymer fibrils can be difficult, such fibrous materials can be compared by measuring the "freeness" of the fiber material. The most popular techniques that measure freeness measure either the Canadian Standard Freeness (CSF) or the Schopper-Riegler Freeness (SRF).

The inventors believe the Canadian Standard Freeness (CSF) is the preferred technique for characterizing the aramid polymer fibrils used herein. The aramid polymer fibrils are preferably made by refining aramid polymer fibers or floc to make the fibrils; such fibrils preferably have a CSF of 0 to 50 milliliters, and in some embodiments, have a CSF of 0 to 20 milliliters. CSF is one indication of the fineness of the aramid polymer fibrils, or the degree they are fibrillated during refining, with very fine aramid polymer fibrils having a very low CSF. Low CSF values also are indicative of uniformly sized fibrils, as materials having a wide distribution of sizes generally have high CSF values.

The aramid polymer fibrils defined herein are fibrous material and are distinct from the traditional aramid polymer pulps of the prior art. Such aramid polymer pulps are preferably made by refining floc or can be made directly from ingredients as was taught in U.S. Pat. Nos. 5,202,184; 5,523,034; and 5,532,034. However, not only do such processes provide fibrous material having a wider range of fiber sizes and lengths, due to the difficulty of controlling such processes, the processes and can provide both "stalks" and fibrils extending from the stalks, with the stalk being a generally columnar remnant of the original aramid polymer floc and being about 10 to 50 microns in diameter. Further, in the case of traditional aramid polymer pulp, the length measurement is understood to be the length of the stalk feature of the pulp, which is also referred to as the "pulp-stalk".

Also, the average length-to-diameter ratio of the aramid polymer fibrils suitable for use as a separator or insulation for electrochemical cells is far greater than the average length-to-diameter ratio for conventional aramid polymer pulp, such as made by the processes in U.S. Pat. Nos. 5,084,136; 5,171,402; and 8,211,272, which is believed to have an average length-to-diameter ratio generally less than 150; or the average length-to-diameter ratio of highly refined pulp such as disclosed in US patent publications 2016/0362525 and 2017/0204258 which is believed to have an average length-to-diameter ratio less than that of conventional pulp (e.g., generally less than 100).

It is believed fibrils having a higher average length-to-diameter ratio contribute to better paper barrier properties, including low/small pore size and higher Gurley-Hill porosity, along with higher paper tensile strength.

Further, the aramid polymer fibrils have essentially no stalks present or are stalk-free aramid polymer fibrils. As used herein, the term "stalk-free aramid polymer fibrils" means that at least 95% by weight of the fibrous material are aramid polymer fibrils having the desired diameter of 10 to 2000 nanometers by optical measurement of a fibril sample using 500× or 1000× magnification. In some embodiments, at least 98% by weight of the fibrous material are aramid polymer fibrils having the desired diameter of 10 to 2000 nanometers by optical measurement of a fibril sample using 500× or 1000× magnification. In some embodiments, 100% by weight of the fibrous material are aramid polymer fibrils having the desired diameter of 10 to 2000 nanometers by optical measurement of a fibril sample using 500× or 1000× magnification.

Figure 2:
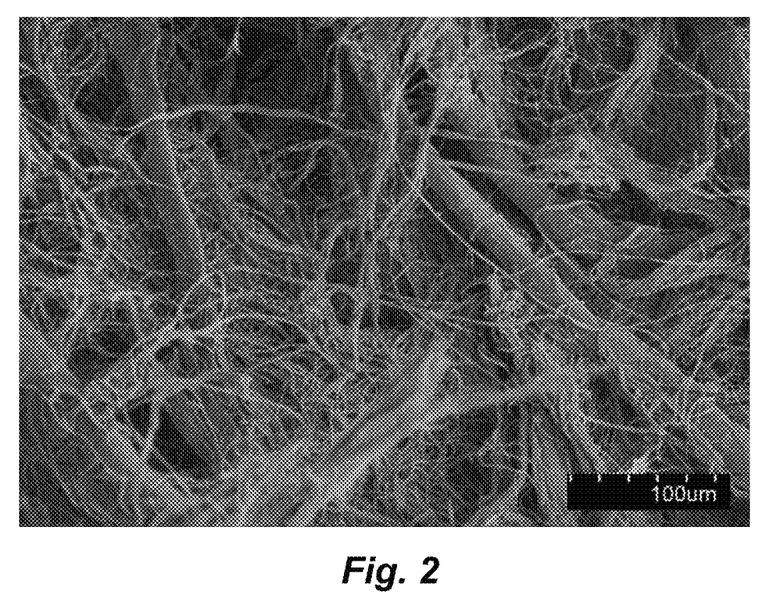
FIG. 2 is a representation of a commercially available PPD-T pulp.

One preferred method of generating stalk-free aramid polymer fibrils is to refine a fiber or floc made from a polymer blend containing at least two polymers wherein a majority amount (greater than 50 weight percent) of aramid polymer is present. One preferred polymer blend is a polymer blend of 80 to 96 weight percent polyparaphenylene terephthalamide (PPD-T) and 4 to 20 weight percent of polyvinylpyrrolidone (PVP). When aramid fiber or aramid floc made from this PPD-T/PVP polymer blend is refined, the resulting fibrous material is essentially all fibrils and there are essentially no larger stalks present in the material, as shown in the digital photo of FIG. 1. It is believed that at least 4 weight percent PVP must be present in the original fiber or floc in order for the fiber or floc to be refined into fibrils with essentially no stalks remaining. This is compared to traditional refined aramid pulp made from polyparaphenylene terephthalamide (PPD-T) homopolymer as shown in FIG. 2, having visible stalks.

It has been found that the porosity and the crystal nature of filaments made from the blend of 80 to 96 weight percent PPD-T and 4 to 20 weight percent of PVP are dramatically different from filaments consisting solely of PPD-T. Herein, the term "fiber" is used interchangeably with the term "filament". Fiber spun directly from a polymer solution onto a bobbin without cutting is commonly referred to as continuous fiber or continuous filament, and multifilament yarns comprise a plurality of continuous filaments.

Figure 3:
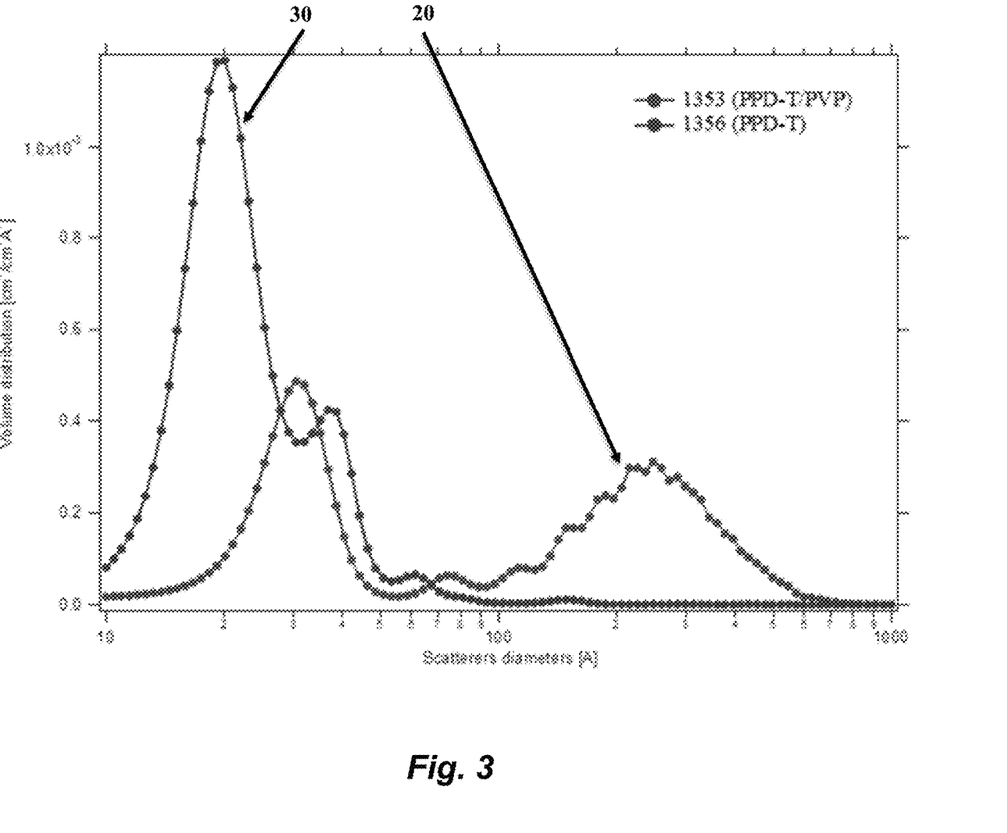
FIG. 3 is a graphical representation comparing the distribution of pores in PPD-T/PVP filaments versus PPD-T filaments.

FIG. 3 illustrates the difference in the x-ray scattering of the two types of filaments. Curve 20 is representative of the PPD-T/PVP blend filaments, while curve 30 is representative of the filaments made solely with PPD-T. Curve 30 illustrates the PPD-T filaments have a significant peak centered at about 2 angstroms (and a much lesser peak centered around 4 angstroms) indicating very small pores in the fiber. Curve 20 illustrates the PPD-T/PVP blend has a much broader distribution of pore size, with a peak centered at about 3 angstroms and a very broad sloping peak centered at about 250 angstroms but extending over an area ranging from about 70 to 600 angstroms. It is believed this indicates the filaments made from the PPD-T/PVP blend have a very large number of much larger pores than the PPD-T filaments.

Further, it is believed that because of this difference in the fiber crystallinity and pore structure, when the filaments are mechanically refined, the result is a much finer and more uniform distribution of fibrils, as illustrated in FIG. 1. In other words, it is believed the very high crystallinity and low porosity of the PPD-T fiber means that when it is mechanically refined, the refining shearing action primarily abrades the surface of the filaments creating the typical stalks-with-fibrils structure (as shown in FIG. 2); while the lower crystallinity and high porosity of the PPD-T/PVP blend filaments makes them more conducive to easy separation into individual refined fibrils under the same shearing action; with a larger number of smaller and relatively more uniform diameter fibrils, and more importantly essentially without any stalks (i.e., stalk-free). It is believed the aramid polymer fibrils have a relatively uniform diameter having a total diameter size range of about 300 nanometers as measured visually from SEM photomicrographs.

The aramid polymer fibrils are preferably made from aramid floc having as the majority polymeric material component by weight PPD-T, and at least one other polymeric material component; these components are preferably mutually immiscible so that the at least two polymeric materials will be present in the floc in closely-mixed but separate solid phases. Such aramid flocs, when refined, yield aramid polymer fibrils with domains of two distinct polymeric materials; one phase being the continuous or primary polymer phase, or the PPD-T polymer, and the other phase being the discontinuous or secondary polymer phase, which is in the preferred instance PVP polymer.

It is believed the discontinuous or secondary polymer phase is present as small, nanometer-sized crystal domains of material running through the floc and serving, in the refining process, as points of disruption in the floc structure to promote ready and more complete refining of the floc into fibrils. After the refining, a portion of the discontinuous or secondary polymer from each disruption point is present on or at the surface of each fibril that results from the refining process.

The aramid polymer fibrils also have high surface area. The words "surface area", "specific surface area", and "BET surface area" are used interchangeably herein. The aramid polymer fibrils have a specific surface area of from about 3 to 40 $m^2/g$. In some embodiments, the specific surface area is 6 $m^2/g$ or greater; in some embodiments, the specific surface area is 8 $m^2/g$ or greater. One particularly preferred range of specific surface area is from 6 to 20 $m^2/g$.

Comparatively, traditional pulp refined from floc made from a single polymeric material, or from a miscible blend of polymeric materials that does not have the domains of discontinuous secondary polymer, will not have such a high surface area. Further, if this floc is refined enough to have such a measured high surface area, the resulting pulp particles have such a low aspect ratio (resulting from very low average length) they will not provide adequate strength.

The preferred aramid fibrils comprise 80 to 96 weight percent poly (paraphenylene terephthalamide) (also known and used herein as polyparaphenylene terephthalamide or PPD-T). By PPD-T is meant the homopolymer resulting from mole-for-mole polymerization of p-phenylene diamine and terephthaloyl dichloride and, also, copolymers resulting from incorporation of small amounts of other diamines with the p-phenylene diamine and of small amounts of other diacid chlorides with the terephthaloyl dichloride. As a general rule, other diamines and other diacid chlorides can be used in amounts up to as much as about 10 mole percent of the p-phenylene diamine or the terephthaloyl dichloride, or perhaps slightly higher, provided only that the other diamines and diacid chlorides have no reactive groups which interfere with the polymerization reaction. PPD-T also means copolymers resulting from incorporation of other aromatic diamines and other aromatic diacid chlorides such as, for example, 2,6-naphthaloyl chloride or chloro- or dichloro-terephthaloyl chloride; provided, only that the other aromatic diamines and aromatic diacid chlorides be present in amounts which permit preparation of anisotropic spin dopes. Preparation of PPD-T is described in U.S. Pat. Nos. 3,869,429; 4,308,374; and 4,698,414.

The preferred aramid fibrils also comprise 4 to 20 weight percent of poly (vinyl pyrrolidone) (also known and used herein as polyvinylpyrrolidone or PVP. By PVP is meant the polymer which results from linear polymerization of monomer units of N-vinyl-2-pyrrolidone and includes small amounts of co-monomers that may be present in concentrations below those that do not interfere with the interaction of the PVP with the PPD-T. PVP of molecular weights ranging from as little as about 5000 to as much as about 1,000,000 can be used. PVP of very high molecular weight yields spinning dopes of high viscosity. PVP with a molecular weight of about 10,000 to about 360,000 is preferred.

Aramid polymer fibrils are preferably made by solution spinning a continuous filament yarn from a dope containing an aramid polymer, cutting the continuous filament yarn into floc, and then mechanically refining that floc into fibrils using one or more refiners. In a preferred process the dope is a solution containing a combination of PPD-T polymer and PVP polymer in sulfuric acid. Example representative processes for making continuous filament yarn are found in U.S. Pat. Nos. 5,073,440 and 5,094,913 and US Pat. Pub. US2006/0113700. Aramid floc is then cut from the continuous filament yarn. Prior to refining, the aramid floc generally has a length of from about 2 millimeters to about 25.4 millimeters, in some instances 2 to 10 millimeters, or even 3 to 10 millimeters.

Aramid polymer fibrils are preferably produced from floc by refining or fibrillating the PPD-T/PVP floc using techniques that cut, masticate, or abrade the PPD-T/PVP floc using mechanical methods familiar to papers, e.g., dry and wet disc or cone refining, hydrapulping, and beating. Preferably the refining is conducted on a dispersion of the floc in water, and preferably the dispersion is refined multiple passes through the refiner. That is, the refined dispersion leaving the refiner is recycled back through the same or a second refiner for a second pass through the refiner, and so on. The starting dispersion generally has a solids content of about 1 to 4 weight percent of the floc in water. The starting floc preferably has a length of about 3 to 25.4 millimeters (0.125 to 1 inches).

If the floc is a PPD-T/PVP floc, the floc can be fully fibrillated to stalk-free aramid polymer fibrils after just three passes through the refiner and is then suitable for making paper. The stalk-free aramid polymer fibrils have a very low Canadian Standard Freeness (CSF) compared to pulp made from fibers that have tendency to fibrillate into a mixture containing a large quality of stalks combined with fibrils. While suitable fibrils result from three passes through the refiner, additional passes through the refiner may be made, with as many as 20 or more passes thought useful to further distribute and uniformize the fibrils, as long as the final strength of the paper is not negatively affected. Preferably the fibrils are made by recycling the dispersion through the refiner for 3 to 20 passes; in some embodiments 3 to 10 passes through the refiner are used.

Once refined, the fibril-water mixture can be used directly as the furnish for a papermaking machine; or water can be added or removed from the mixture prior to its use as the furnish for the papermaking machine. The fibril-water mixture can optionally be combined with a slurry of a refined fibrid-water mixture to prepare a furnish containing both fibrils and fibrids as the fibrous material for use in a papermaking machine. Because of the high surface area of the fibrils, the consistency of the paper-making furnish is like that of a thick, highly viscous flour-water mixture, similar to a gel. Generally, for making suitable papers, the aqueous furnish should have less than 5 weight percent fibrous material, preferably less than about 0.05 weight percent. It is thought that higher amounts of fibrous material are too viscous to be made into suitable papers. In some embodiments, the aqueous furnish should have less than 5 weight percent fibrils, preferably less than about 0.05 weight percent fibrils. If desired, the additional PVP coating can be included in the furnish.

The fibrous material in water is converted to paper on a suitable paper-making device capable of making very thin papers. Representative devices include continuous process such as, for example without limitation to, a Fourdrinier or inclined wire machine, or batch processes such as those that make paper by hand in a hand-sheet mold containing a forming screen. Reference may be made to U.S. Pat. No. 3,756,908 to Gross and U.S. Pat. No. 5,026,456 to Hesler et al. for general processes of forming aramid materials into papers.

Specifically, commercially-suitable processes for making papers on a paper-making machine can include providing an aqueous dispersion containing the fibrous material, in the desired amount and proportion of fibrils and optionally fibrids and other fibrous materials, to the headbox of the paper-making machine and then uniformly wet-laying and dispersing these solids as a web onto a papermaking wire and removing the majority of the liquid water. The wet web can then be dried on dryer drums to form a paper. Preferably the paper is then further calendered or pressed in the nip of a hot roll calender under pressure and heat, or by other means, to consolidate and densify the paper into a layer having the desired thickness and properties.

It is believed that with adequate care, stalk-free aramid polymer fibrils could be obtained from more traditional PPD-T pulp if a subsequent process after the refining step was used to separate or recover the fibrils from the stalks. It is contemplated that if such fibrils met the definition of "stalk-free" as put forth herein, they would be suitable fibrils for use in the paper.

A paper suitable for use as a separator or thermal or fire insulation in an electrochemical cell can have a number of preferred properties. These preferred paper properties can include a specific thickness range; adequate minimum tensile strength that makes it suitable for use in the fabrication of batteries; a suitable mean flow pore size range; and other properties that provide value-in-use, such as flame-retardancy. A flame-resistant paper is especially desirable.

The PVP coated paper preferably has a thickness of 10 to 50 micrometers. This thickness range is compatible with the typical space available in battery of a paper separator. Paper thicknesses of lower than 10 micrometers are not thought to have adequate strength to handle battery manufacturing steps and paper thicknesses of greater than 50 micrometers have limited applicability due to limited space in a typical battery; also, such thicker papers have increased cost, which is not desirable. In some embodiments, the thickness of the paper is 15 micrometers or greater; in some embodiments, the thickness of the paper is 40 micrometers or less. One preferred paper thickness range is from 15 to 40 micrometers.

The PVP coated paper that is suitable for use in or with electrochemical cells has a tensile strength of at least 15 megapascals or greater. It is believed the paper needs this level of tensile strength to survive the battery fabrication process, which includes the cell winding process (wrapping separator with current collector, anode and cathode). The tensile strength also contributes to the dendrite barrier of the separator in use. In some embodiments, the paper preferably has a tensile strength of 50 megapascals or less. In some embodiments, the paper preferably has a tensile strength of 100 megapascals or less. Tensile strengths above this value do not have negative effects, but the parameter reaches a point of diminishing value. In some embodiments, the paper has a tensile strength of from 15 to 50 megapascals. In some embodiments, the paper has a tensile strength of from 15 to 100 megapascals.

In some embodiments, the PVP coated paper preferably has a mean flow pore size of 0.01 to 0.5 micrometers. It is believed that a paper having a mean flow pore size in this range will have a good electrolyte absorption through capillary force, thereby having low ionic resistance while also having good barrier properties capable of preventing internal shortage caused by lithium metal dendrites. In some preferred embodiments, the paper has a mean flow pore size of about 0.05 to 0.5 micrometers.

The inventors have also found that single layers of the paper containing PPD-T/PVP fibrils have surprisingly good flammability performance when tested in the Thermal Performance Protection Test (TPP). TPP is a measure of the flammability performance to combined radiant and convective heat. The paper containing PPD-T/PVP fibrils was found to have superior TPP performance, when normalized for thickness, to paper made solely from PPD-T floc. That is, the paper containing PPD-T/PVP fibrils performed better on a thickness normalized basis than paper containing PPD-T floc, which is inherently flame resistant, even though the paper did not contain all aramid materials, and actually contained PVP, which is a flammable thermoplastic.

In some embodiments, the fibrous material in the paper is solely fibrils. However, in some embodiments, the paper comprises 95 to 100 weight percent fibrils and 0 to 5 weight percent aramid fibrids, based on the total amount of fibrils and fibrids in the paper. In some embodiments, the paper comprises fibrils and fibrids, with the fibrils being present in an amount of 95 to less than 100 weight percent, based on the total amount of fibrils and fibrids in the paper.

Aramid fibrids, when optionally present in the paper, are used as a binder material. While fibrids are fibrous material, fibrids are not fibers. The term "aramid fibrids" refers to non-granular film-like particles of aromatic polyamide having a melting point or decomposition point above 320° C. The fibrids have an average length of 0.2 to 1 mm with a length-to-width aspect ratio of 5:1 to 10:1. The thickness dimension is on the order of a fraction of a micron. Such aramid fibrids, before being dried, can be used wet and can be deposited as a binder physically entwined about the floc component of a paper. The fibrids can be prepared using a fibridating apparatus such as disclosed in U.S. Pat. No. 3,018,091 where a polymer solution is precipitated and sheared in a single step. The preferred aramid fibrids comprise poly(metaphenylene isophthalamide) polymer.

By poly (metaphenylene isophthalamide) (also known and used herein as polymetaphenylene isophthalamide or MPD-I) is meant the homopolymer resulting from mole-for-mole polymerization of m-phenylene diamine and isophthaloyl dichloride and, also, copolymers resulting from incorporation of small amounts of other diamines with the m-phenylene diamine and of small amounts of other diacid chlorides with the isophthaloyl dichloride. As a general rule, other diamines and other diacid chlorides can be used in amounts up to as much as about 10 mole percent of the m-phenylene diamine or the isophthaloyl dichloride, or perhaps slightly higher, provided only that the other diamines and diacid chlorides have no reactive groups which interfere with the polymerization reaction. MPD-I also means copolymers resulting from incorporation of other aromatic diamines and other aromatic diacid chlorides, provided only that the other aromatic diamines and aromatic diacid chlorides be present in amounts which do not permit preparation of is anisotropic spin dopes. Preparation of MPD-I is described in U.S. Pat. Nos. 3,063,966 and 3,287,324.

The addition of the fibrids in the paper improves the mechanical strength of separator by binding fibrils together; however, the fibrids are also a good barrier in electrolyte transportation and therefore their presence increases ionic resistance.

The PVP coated paper especially useful as a separator in lithium ion batteries has an ionic resistance of less than about 10 ohms-cm$^2$, and advantageously between about 1 ohms-cm$^2$ and 5 ohms-cm$^2$. In some embodiments, the paper separator has a MacMullin number of between about 2 and 15, and in some embodiments, is about 4 to about 13. In some other embodiments, the MacMullin number is about 4 to about 10. The MacMullin Number (Nm) is a dimensionless number and is a measure of the ionic resistance of the separator, and is defined as the ratio of the resistivity of a separator sample filled with electrolyte to the resistivity of an equivalent volume of the electrolyte alone.

In some other embodiments, this invention relates to an electrochemical cell comprising a paper as a electrolyte separator or as thermal or flame insulation, the paper, comprising:
  a) 90 to 99 weight percent, based on the total weight of the paper, of an aramid fibrous pulp, the aramid fibrous pulp comprising aramid polymer fibrils, wherein the aramid polymer fibrils have:
    i) a diameter of 10 to 2000 nanometers,
    ii) a length of 0.2 to 3 millimeters,
    iii) a specific surface area of 3 to 40 square meters/gram, and
    iv) a Canadian Standard Freeness of 0 to 100 milliliters; and
  b) 1 to 10 weight percent, based on the total weight of the paper, of polyvinylpyrrolidone present as a coating on the surface of the fibers;
  the paper having a thickness of 10 to 40 micrometers and a tensile strength of at least 15 megapascals or greater. In some embodiments the coating is neither chemically nor electrostatically bound to the fibers.

The term "electrochemical cell" is used interchangeably herein with the term "battery"; and further, the term electrochemical cell is intended to include such things as capacitors and other devices having (1) a cathode, (2) an anode, (3) a physical separating device between the cathode and anode to help prevent short-circuiting, and (4) some type of electrolyte. In many uses, battery separators are located between the positive (cathode) and negative (anode) plates in batteries and provide a structural separation between these electrodes of opposite charge, while allowing the electrolyte to assist the passage of current through the separator.

It is intended that the electrochemical cell can comprise a paper as thermal or flame insulation, meaning the paper can be used either internally to the electrochemical cell, or use externally to the electrochemical cell. For example, the paper can be used as thermal insulation or flame barrier inside an electrochemical cell, or used to thermally isolate an electrochemical cell from other electrochemical cells. It is intended that the use of the paper as external thermal or flame insulation can further extend to insulating a bank of electrochemical cells or insulating an electrochemical cell module or battery module, without limitation. Preferably the paper is both a thermal insulator and a flame barrier, preventing or retarding a hot spot in one electrochemical cell from affecting another electrochemical cell, and if a fire should result, acting as a flame barrier between the cells or battery modules.

The properties, features, and elements of the papers used in the electrochemical cell as a electrolyte separator or as thermal or flame insulation/barriers are the same as the properties, features, and elements of both the uncoated and PVP-coated papers that were previously described herein as being suitable for that use. Further, the inventors have also found that single layers of the papers are useful as both thermal and flame barriers. In particular, as previously stated herein, the inventors have also found that single layers of the paper containing PPD-T/PVP fibrils have surprisingly good flammability performance when tested in the Thermal Performance Protection Test (TPP). TPP is a measure of the flammability performance to combined radiant and convective heat. The paper containing PPD-T/PVP fibrils was found to have superior TPP performance, when normalized for thickness, to paper made solely from PPD-T floc. That is, the paper containing PPD-T/PVP fibrils performed better on a thickness normalized basis than paper containing PPD-T floc, which is inherently flame resistant, even though the paper did not contain all aramid materials, and actually contained PVP, which is a flammable thermoplastic.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

Test Methods

The following test methods were used in the Examples provided below.

The average thickness of the base and friction papers were measured according to ASTM D645M-97 (2007) using a Thwing-Albert ProGage instrument at 5 points of the paper sample.

The average thickness of the friction paper was measured by thickness gauge, model ID-C1128 Mitsutoyo Corporation, and the thickness of breaking point of the paper sample was used.

The thickness of papers suitable for use as a separator or insulation for electrochemical cells was measured according to ASTM D374-99 and reported in mils and converted to micrometers.

The areal weight of the base papers suitable for friction papers and friction papers was measured according to ASTM D646-13.

The areal weight of the friction paper was calculated by measured weight divided by area (21 cm×9 cm) right after the curing.

The basis Weight of papers suitable for use as a separator or insulation for electrochemical cells was measured according to ASTM D 646-96 and reported in $g/m^2$.

The porosity and air permeability of the base papers suitable for friction papers and friction papers was measured according to ASTM D726-94 using a Genuine Gurley 4320 Gurley Densometer 4110 (Gurley Precision Instruments, Troy, N.Y). Individual samples were placed in the holder of the Densometer and air at a pressure of 0.304 (kPa) is forced through an area of 0.1 $inch^2$ or 0.645 $cm^2$ of the sample, recalculated by software to 1 $inch^2$ or 6.45 $cm^2$. The time in seconds required for 300 cc ($cm^3$) of air to pass through the sample was recorded as the Gurley air permeability with the units of (s/300 $cm^3$ or s/300 cc), referred to herein as the Gurley air permeability 300 cc value. Values are reported as an average of 5 tests of each sample. The machine also calculates the porosity. Qualitatively, porosity and permeability are related in that a higher porosity leads to a higher permeability, although it should be noted that the permeability is recorded here in terms of the time (in seconds) that it takes for 300 cc of air to pass through the sample. A shorter (smaller) time equates to a higher permeability; so the time in seconds is actually inversely related to the permeability.

The Gurley Hill Porosity for papers suitable for use as a separator or insulation for electrochemical cells was measured by air resistance in seconds per 100 milliliters of cylinder displacement for approximately 6.4 square centimeters circular area of a paper using a pressure differential of 1.22 kPa in accordance with TAPPI T460 om-96.

The Mean Flow Pore Size for papers suitable for use as a separator or insulation for electrochemical cells was measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 µm to 300 µm by using automated bubble point method from ASTM Designation F 316-03.

The Bubble Point for papers suitable for use as a separator or insulation for electrochemical cells was measured according to ASTM F 316-03 (2011). The bubble point test for maximum pore size is performed by prewetting the filter, increasing the pressure of gas upstream of the filter at a predetermined rate and watching for gas bubbles downstream to indicate the passage of gas through the maximum diameter filter pores. The pressure required to blow the first continuous bubbles detectable by their rise through a layer of liquid covering the filter is called the "bubble point", and is used to calculate maximum pore size.

Ionic resistance for papers suitable for use as a separator or insulation for electrochemical cells was measured according to ASTM D7148-13 and reported in milliohms-$cm^2$.

Porosity for papers suitable for use as a separator or insulation for electrochemical cells was measured according to ASTM C830-00 and reported in percent (%).

MacMullin Number (Nm) is a dimensionless number and is a measure of the ionic resistance of the separator, and is defined as the ratio of the resistivity of a separator sample filled with electrolyte to the resistivity of an equivalent volume of the electrolyte alone.

Tensile Strength and elongation for papers suitable for use as a separator or insulation for electrochemical cells was measured according to ASTM D 828-97 with 2.54 cm wide test specimens and a gage length of 18 cm and reported in N/cm.

The tensile strength values of both the base papers suitable for friction papers and friction papers were measured according to ASTM D828-16. Values are reported as an average of 8 tests of each sample.

EXAMPLES

The following examples are given to illustrate the invention and should not be interpreted as limiting it in any way. All parts and percentages are by weight unless otherwise indicated. Examples prepared according to the current invention are indicated by numerical values. Control or Comparative Examples are indicated by letters. Data and test results relating to the Comparative and Inventive Examples are shown in Tables 1 and 2.

The pulp used in all examples was p-aramid Kevlar® merge 1F892 at 2.25 denier per filament commercially available from E.I. DuPont de Nemours and Company, Wilmington, Del.

The floc was p-aramid Kevlar® merge 1F570 at 3 mm cut length also commercially available from E.I. DuPont.

The PVP was obtained from BASF, Florham, N.J. under the tradename Sokalan. The grade was K30P.

Preparation of Base Paper for Comparative Example A p-aramid pulp was added to water while stirring to provide a 2% slurry of p-aramid pulp. The slurry was filtered through a filter bag and the wet filter cake pressed at ambient temperature in a flat press at a pressure of 100 psi for 1 minutes to complete dewatering. The paper was not dried.

7.46 g of p-aramid pulp was added to 2.5 liters of water to form a second slurry which was then fed over a filter screen on a laboratory paper making machine. The formed paper was not further pressed but was dried for 5 minutes at 300+/−20° C.

The dried paper had an average thickness of 0.72 mm, an areal weight of 168 g/m² (gsm, grams per square meter) and a porosity of 83.8%. The paper was tested for air permeability and tensile strength with the results being shown in Table 1.

Preparation of Base Paper for Example 1

This was prepared in a similar way to Comparative Example A except that after the p-aramid pulp was added to make the slurry, an amount of PVP was also added, while stirring, in an amount such that the weight of PVP added was 5% of the weight of added p-aramid pulp. The pressures, times and temperatures were the same as for Comparative Example A.

The dried paper had an average thickness of 0.69 mm, an areal weight of 170 g/m² and a porosity of 82.9%. The paper was tested for air permeability and tensile strength with the results being shown in Table 1.

Preparation of Base Paper for Example 2

This was prepared in a similar way to Comparative Example A except that after the p-aramid pulp was added to make the slurry, an amount of p-aramid floc was added, while stirring, in an amount such that the weight of p-aramid floc added was 20% of the weight of added p-aramid pulp and an amount of PVP was also added, while stirring, in an amount such that the weight of PVP added was 5% of the weight of added p-aramid pulp. The pressures, times and temperatures were the same as for Comparative Example A.

The dried paper had an average thickness of 0.76 mm, an areal weight of 164 g/m² and a porosity of 85.1%. The paper was tested for air permeability and tensile strength with the results being shown in Table 1.

TABLE 1

| Example Ref. | Tensile Strength (MPa) | Gurley 300 cc Permeability (s) | Ratio of Tensile: Gurley (MPa/s) |
|---|---|---|---|
| Comp. Ex. A | 4.6 | 2.1 | 2.2 |
| Ex. 1 | 9.2 | 2.1 | 4.4 |
| Ex. 2 | 14.9 | 1.0 | 14.9 |

Preparation of Friction Papers

To test the efficacy of the base paper as a friction material, the base papers were dipped in a phenolic resin. The resin was type PR54562 in a methanol solvent (30% solution) from Sumitomo Bakelite, NA (Novi, Mich., USA). After dipping, the paper was removed and surplus resin allowed to drain away. The paper was air dried for 30 minutes and then dried in an oven at 100° C. for 15 minutes. The resin content of the paper was measured by percent concentration of mass. The paper was then placed between glass plates and the resin cured at 165° C. for 10 minutes followed by a post-cure in an oven at 165° C. for 5 hours. The resin content in the coated paper was determined by comparing the relative weights of the paper before and after resin coating.

Comparative Example B was made from the base paper of Comparative Example A. Examples 3-8 were made similarly to Comparative Example B except that during the making of the base paper, PVP was added as described for Example 1 in amounts shown as in Table 2.

Physical properties averaged over 7 samples were determined for each type of friction paper and are summarized in Table 2.

Tensile tests were carried out on 120×10 mm test samples of friction paper with a chuck distance of 60 mm. Thickness was measured at three points along the sample and the thickness nearest the break point used in the calculation. The tests were carried out at a speed of 1 mm per minute at ambient temperature (about 23° C.). The highest and lowest tensile values were eliminated and the average tensile strength determined from the remaining five samples (below, Table 2).

TABLE 2

| Test | Comp B | 3 | 4 | 5 | 6 | 7 | 8 |
|---|---|---|---|---|---|---|---|
| % PVP | None | 3 | 5 | 7 | 10 | 15 | 20 |
| Resin % | 30.1 | 29.0 | 28.4 | 29.5 | 29.5 | 28.9 | 29.8 |
| Thickness (mm) | 0.84 | 1.02 | 0.81 | 0.79 | 0.78 | 0.79 | 0.75 |
| Areal Weight (gsm) | 255.7 | 283.1 | 228.6 | 221.2 | 250.8 | 248.7 | 229.1 |
| Tensile (MPa) | 7.20 | 7.61 | 8.95 | 8.18 | 11.17 | 10.40 | 10.24 |
| Gurley 300 cc Permeability (s) | 2.3 | 3.1 | 2.5 | 2.5 | 2.6 | 3.3 | 2.9 |

Conventional knowledge is that as the porosity of a paper increases, the tensile strength decreases. For friction papers it is desirable to have an increased tensile strength without detriment to porosity. Unexpectedly and surprisingly, it was found that addition of PVP to the base paper pulp allowed for such an increase in friction paper tensile values while maintaining acceptable porosity levels. PVP additions of around 10% by weight seemed to give optimal tensile performance.

Example 3

Preparation of Papers Suitable for Use as an Electrolyte Separator or as Thermal or Flame Insulation in an Electrochemical Cell Three aramid papers were manufactured from aramid polymer fibrils made from a mixture of PPD-T and PVP. The fibrils had a Canadian Standard Freeness of 0 ml and a specific surface area after drying of 13.8 m$^2$/g. The PPD-T/PVP fibrils were composed of 87 weight percent PPD-T and 13 weight percent PVP, and had an average length-to-diameter ratio of about 2000. Each paper was prepared from an aqueous dispersion of 100% PPD-T/PVP fibrils in water. The aqueous dispersion was poured with 8 additional liters of water into a 21×21 cm hand-sheet mold and a wet-laid sheet was formed. Each hand-sheet was then removed and placed between two pieces of blotting paper, hand couched with a rolling pin and dried in a hand-sheet dryer at 150° C. for 10 minutes. Properties of the resulting paper structures are listed in the Table 3.

The basis weights of the three papers was recorded. One paper was used as a control, without any PVP addition. Two aqueous PVP solutions were made by dissolving PVP in water. The first solution had a PVP concentration of 2.5 wt % while the second solution had a PVP concentration of 5 wt %. A spray coating of PVP was then applied on the remaining two papers, the first paper being sprayed with the first solution and designated 3A while the second paper was sprayed with the second solution and designated 3B. The PVP-coated paper was then dried in the oven at 130° C. overnight to allow for the PVP to crosslink. The exact amount of PVP addition was then measured by comparing the weights of the papers before and after applying the PVP. Basic electrochemical properties were listed in the Table 3 below. The cross-linking of PVP provided papers that were appreciably higher in tensile strength; however, they did not negatively impact the Gurley Hill Porosity and mean pore size, making Items 3A and 3B suitable for use as a separator or insulation for electrochemical cells Example 4

Preparation of Electrochemical Cell Comprising Papers Suitable for Use as an Electrolyte Separator or as Thermal or Flame Insulation in an Electrochemical Cell Separator papers 3A and 3B from Example 3 are used individually as battery separator papers in the making of two battery cells. Each battery has (1) a cathode, (2) an anode, (3) a physical separating device between the cathode and anode to help prevent short-circuiting, and (4) some type of electrolyte. In the batteries, the battery separator papers 3A and 3B are located between the positive (cathode) and negative (anode) plates in the batteries and provide a structural separation between these electrodes of opposite charge, while allowing the electrolyte to assist the passage of current through the separator.

TABLE 3

| Paper Properties | Unit | Control | 3A | 3B |
|---|---|---|---|---|
| Amount of PVP on Paper | Weight % | 0% | 2.11% | 3.92% |
| Tensile Strength | N/cm | 4.31 | 9.36 | 11.09 |
| | (kg/cm$^2$) | (132.8) | (302.3) | (338.0) |
| | [MPa] | [13.02] | [29.65] | [33.14] |
| Elongation | % | 2.97 | 3.02 | 3.49 |
| Thickness | μm | 33.1 | 31.6 | 33.5 |
| Basis Weight | g/m$^2$ | 9.6 | 9.7 | 10.6 |

TABLE 3-continued

| Paper Properties | Unit | Control | 3A | 3B |
|---|---|---|---|---|
| Density | g/cm$^3$ | 0.305 | 0.350 | 0.303 |
| Gurley-Hill Porosity | seconds | 54.9 | 41.6 | 51.7 |
| Mean Flow Pore Size | μm | 0.204 | 0.208 | 0.207 |
| Max Pore Size | μm | 0.450 | 0.405 | 0.422 |
| Ionic Resistance | Ohm-cm$^2$ | 1.53 | 1.44 | 1.39 |
| Bubble Point (Max Pore Size) | μm | 0.451 | 0.405 | 0.422 |
| Porosity | % | 93 | 93 | 93 |

What is claimed is:

1. A paper, suitable for use as a separator or thermal or flame insulation for electrochemical cells, comprising:
    a) 90 to 99 weight percent, based on the total weight of the paper, of an aramid fibrous pulp, the aramid fibrous pulp comprising aramid polymer fibrils,
        wherein the aramid polymer fibrils have:
            i) a diameter of 10 to 2000 nanometers,
            ii) a length of 0.2 to 3 millimeters,
            iii) a specific surface area of 3 to 40 square meters/gram, and
            iv) a Canadian Standard Freeness of 0 to 100 milliliters; and
    b) 1 to 10 weight percent, based on the total weight of the paper, of polyvinylpyrrolidone present as a coating on the surface of the fibers;
    the paper having a thickness of 10 to 40 micrometers and a tensile strength of at least 15 megapascals or greater.

2. The paper of claim 1 having a tensile strength of 100 megapascals or less.

3. The paper of claim 2 wherein the aramid polymer fibrils comprise a blend of polymers, the blend of polymers comprising greater than 50 weight percent poly(paraphenylene terephthalamide) and at least one other polymer.

4. The paper of claim 1 having a mean flow pore size of 0.01 to 0.5 micrometers.

5. The paper of claim 4 wherein the aramid polymer fibrils comprise a blend of polymers, the blend of polymers comprising 80 to 96 weight percent poly(paraphenylene terephthalamide) and 4 to 20 weight percent of poly (vinyl pyrrolidone).

6. The paper of claim 5 having a tensile strength of 100 megapascals or less.

7. The paper of claim 5 having a mean flow pore size of 0.01 to 0.5 micrometers.

8. The paper of claim 5 wherein the aramid polymer fibrils have a diameter of 10 to 1200 nanometers.

9. The paper of claim 5 further comprising aramid fibrids, wherein the aramid fibrids are present in an amount of up to 5 weight percent based on the weight of the aramid polymer pulp in the paper.

10. The paper of claim 5 further comprising aramid floc.

11. The paper of claim 1 wherein the aramid polymer fibrils have a diameter of 10 to 1200 nanometers.

12. The paper of claim 1 wherein the aramid polymer fibrils comprise poly(paraphenylene terephthalamide).

13. An electrochemical cell or electrochemical cell module comprising a paper as a electrolyte separator or as thermal or flame insulation, the paper comprising:
    a) 90 to 99 weight percent, based on the total weight of the paper, of an aramid fibrous pulp, the aramid fibrous pulp comprising aramid polymer fibrils,
        wherein the aramid polymer fibrils have:
            i) a diameter of 10 to 2000 nanometers,
            ii) a length of 0.2 to 3 millimeters, iii) a specific surface area of 3 to 40 square meters/gram, and iv) a Canadian Standard Freeness of 0 to 100 milliliters; and b) 1 to 10 weight percent, based on the total weight of the paper, of polyvinylpyrrolidone present as a coating on the surface of the fibers;

the paper having a thickness of 10 to 40 micrometers and a tensile strength of at least 15 megapascals or greater.

14. The electrochemical cell of claim 13 wherein the paper has a tensile strength of 100 megapascals or less.

15. The electrochemical cell of claim 13 wherein the paper has a mean flow pore size of 0.01 to 0.5 micrometers.

16. The electrochemical cell of claim 13 wherein the aramid polymer fibrils have a diameter of 10 to 1200 nanometers.

17. The electrochemical cell of claim 13 wherein the aramid polymer fibrils comprise poly(paraphenylene terephthalamide).

18. The electrochemical cell of claim 17 wherein the aramid polymer fibrils comprise a blend of polymers, the blend of polymers comprising greater than 50 weight percent poly(paraphenylene terephthalamide) and at least one other polymer.

19. The electrochemical cell of claim 18 wherein the aramid polymer fibrils comprise a blend of polymers, the blend of polymers comprising 80 to 96 weight percent poly(paraphenylene terephthalamide) and 4 to 20 weight percent of poly (vinyl pyrrolidone).

20. The electrochemical cell of claim 18 wherein the paper has a tensile strength of 100 megapascals or less.

21. The electrochemical cell of claim 18 wherein the paper has a mean flow pore size of 0.01 to 0.5 micrometers.

22. The electrochemical cell of claim 18 wherein the aramid polymer fibrils have a diameter of 10 to 1200 nanometers.

23. The electrochemical cell of claim 18 wherein the paper further comprises aramid fibrids, wherein the aramid fibrids are present in an amount of up to 5 weight percent based on the weight of the aramid polymer pulp in the paper.

24. The electrochemical cell of claim 18 wherein the paper further comprises aramid floc.

* * * * *